Jan. 29, 1963     D. A. COLLINGS     3,075,664
DEVICE FOR HANDLING HOLLOW CYLINDRICAL ARTICLES
Filed Feb. 18, 1960     2 Sheets-Sheet 1
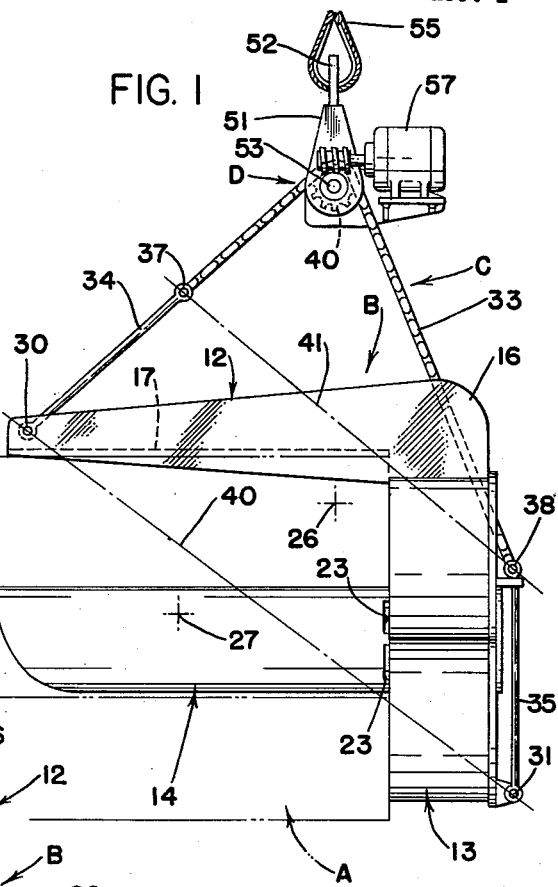
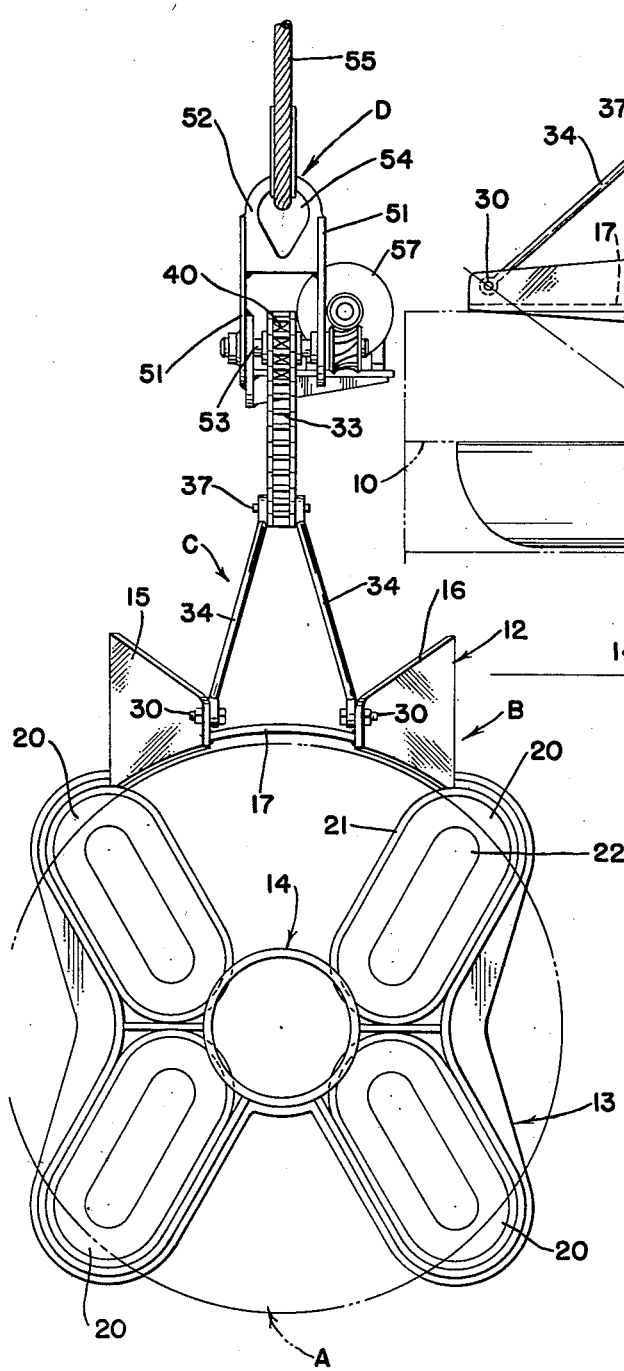
*INVENTOR.*
DAVID A. COLLINGS
BY
*Alfred C Body*
ATTORNEY

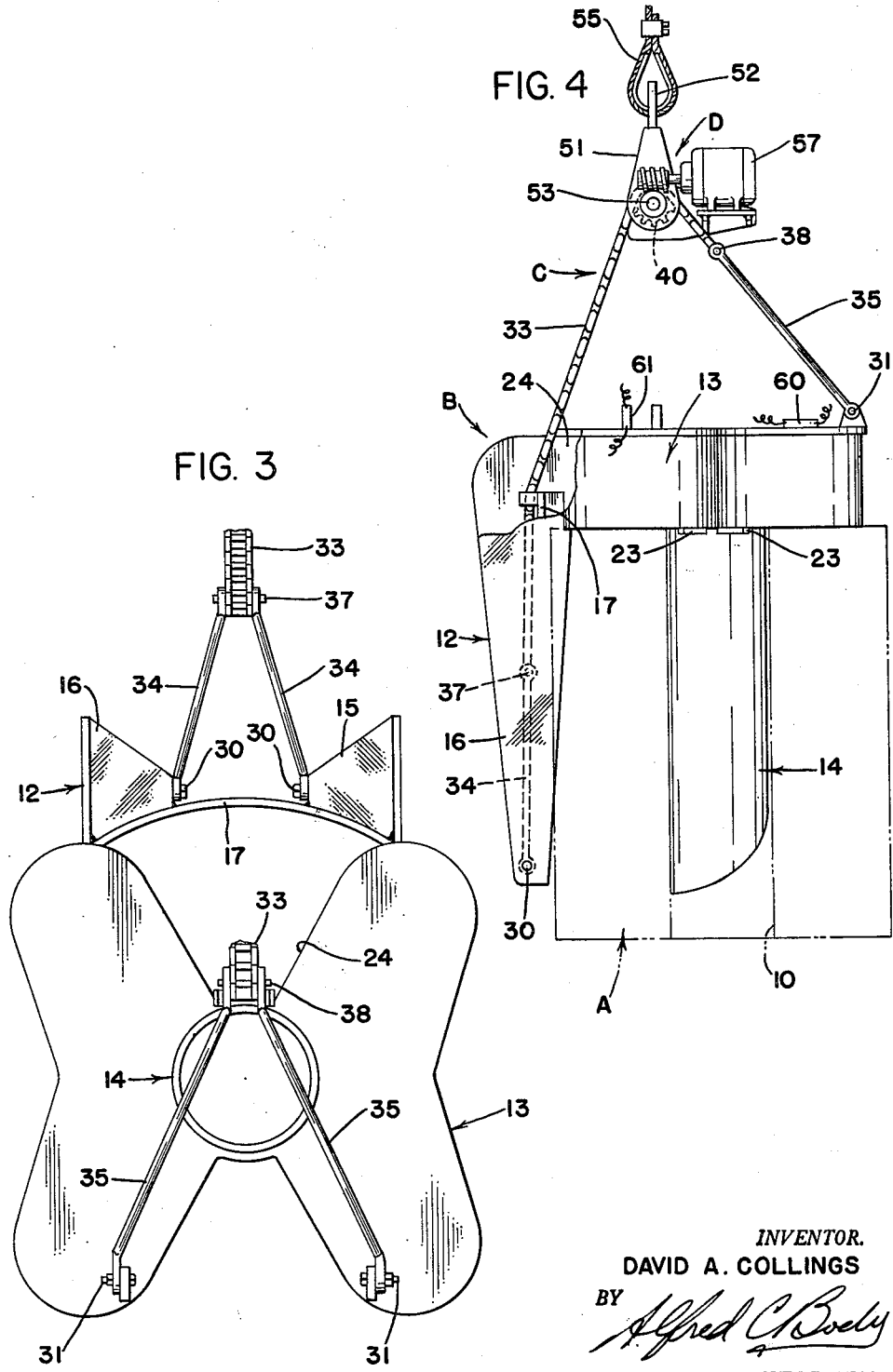

United States Patent Office 3,075,664
Patented Jan. 29, 1963

3,075,664
DEVICE FOR HANDLING HOLLOW
CYLINDRICAL ARTICLES
David A. Collings, Cleveland, Ohio, assignor to
Alfred C. Body, Cleveland, Ohio
Filed Feb. 18, 1960, Ser. No. 9,523
11 Claims. (Cl. 214—658)

This invention pertains generally to the art of material handling and more particularly to apparatus for handling large and heavy hollow cylindrical articles by means of an overhead crane or the like.

The invention is particularly applicable to the handling of cylindrical coils of steel strip having a central axial opening and will be described with particular reference thereto, although it is to be appreciated that the invention is also applicable to the handling of other hollow articles.

In manufacturing plants where coils of steel strip are either manufactured or used in the manufacturing processes, major problems exist in the storing of and moving such coils from the place of storage to the point of use. Thus it is normally considered desirable to store these coils with the axis vertical. However, with the axis vertical, it is difficult to pick the coils up. Tongs and clamps of various types have been utilized in the past, but the pressures required to produce the necessary frictional forces to lift the heavy weight will ordinarily damage a number of layers of the steel strip to the point where they cannot be used. Electro magnets, while eliminating this problem, constitute a safety hazard because of the possibility of the failure of the electric power while the coil is in the air and being transported from one point to another.

Accordingly, it has been conventional to store the coils with the axis horizontal. A hook arbor is then employed comprised of an arbor adapted to be inserted into the opening of the coil and spaced parallel member which is then connected to an overhead crane. However, the storage of coils with the axis horizontal results in a poor efficiency of the use of the storage space and if the coils are stacked one on the other, there is a tendency for the lower coils to be badly bent by the weight of the upper coils.

It has heretofore been proposed as is described in the patent to Douglas No. 2,630,931 to provide an arbor equipped with a magnet and pivoted about one end. The arbor is inserted into a vertical opening of a coil, the magnet energized, and the coil then raised from the ground. The arbor is then pivoted to a horizontal position and the magnet de-energized. The coil may then be transported in the same manner as with a hook-type arbor. With such an arrangement, the center of gravity of the arbor and coils is spaced a substantial distance from the pivot axis and particularly if the tilting action is to take place rapidly, very large motors are required to effect the tilting operation. Also the apparatus is unduly large and expensive.

My United States Letters Patent No. 2,913,276 dated November 17, 1959, and assigned to the assignee of this application, discloses and claims an arrangement which overcomes these difficulties and provides an arrangement whereby the coil and arbor are tilted about a point intermediate the axial ends of the coil which point may be made to generally coincide with or be close to the combined center of gravity of the coil and arbor. Thus as the coil and arbor are tilted to a horizontal axis, there is no, or a minimum, of raising or lowering of the center of gravity, and thus the power required to effect the tilting is held to a minimum.

Such patent, however, required a relatively bulky and heavy arrangement for tilting mechanism.

The present invention provides a similar type of operation to the apparatus of my above-referred-to patent, but in many ways, provides a highly improved apparatus which is simpler in construction, insures a tilting action about the center of gravity and requires minimum power to effect the tilting.

In accordance with the present invention, the handling device includes as heretofore: a frame comprised of a side member adapted to extend longitudinally along one side of the steel coil, an end member rigidly connected to the side members and adapted to extend diametrically across one axial end of the steel coil, an arbor rigidly connected to the end member and adapted to extend into the coil opening, and means for releasably holding the coil on the arbor when its axis is vertical, in combination with an improved suspending and tilting arrangement including: an elongated flexible or articulated tension member pivotally fastened at its ends to the end and side legs at points spaced from the side and end legs respectively a distance at least greater than the spacing of the combined center of gravity of the frame and the maximum length of coil to be handled from such legs, and means for suspending and controllably moving the tension member longitudinally. With such an arrangement, the combined center of gravity of the frame member and of a coil of steel on the frame member will always be located generally below the point of engagement of the power means with the tension member. Longitudinal movement of the tension member always effects a rotation or tilting of the device and coil held thereby close to or on the combined center of gravity of the two.

Further in accordance with the invention and in the event that the tension member is connected to the frame at points on the diagonal line close to or below the center of gravity of the frame and/or the frame and coil combined, the tension member at either or both ends includes rigid portions pivoted to the frame about axes perpendicular to the plane of the tension member and having lengths such that the line between the connection of the rigid and flexible portions is above such center of gravity. By this arrangement, tipping of the frame and/or coil about such diagonal line is prevented.

The principal object of the invention is the provision of a new and improved device capable of picking up hollow articles and tilting the axis from horizontal to vertical or vice versa which is simple in construction, which is safe and which requires a minimum amount of power to effect the tilting operation.

Another object of the invention is the provision of apparatus of the general type described which is of rugged and simplified construction.

Another object of the invention is the provision of a new and improved device of the general type described wherein the tilting always takes place about the combined center of gravity of the frame member and the coil of steel supported thereon so that a minimum amount of power is required to effect a tilting operation.

The invention may take physical form in certain parts and arrangements of parts, a preferred embodiment of which will be described in detail in this specification and illustrated in the accompanying drawings which are a part hereof and wherein:

FIGURE 1 is a side elevational view of a handling device embodying the present invention in operative position with a coil of steel strip with the latter's axis horizontal;

FIGURE 2 is an end elevational view of FIGURE 1 taken from the left end of FIGURE 1;

FIGURE 3 is a fragmentary end elevational view of FIGURE 1 taken from the right end of FIGURE 1; and FIGURE 4 is a view similar to FIGURE 1, but with the device rotated through an angle of 90° and with the axis of the steel coil vertical.

Referring now to the drawings wherein the showings are for the purposes of illustrating a preferred embodiment of the invention only and not for the purposes of limiting same, FIGURE 1 shows a coil of steel strip A supported on a frame B which is suspended from a tension member C in turn operatively associated with a support member D.

The coil A is generally in the shape of a cylinder comprised of a multitude of layers of the strip wound in a spiral and having as is conventional, a central axially extending opening 10. The coil A may be of any desired material, and in fact may be a solid member so long as it has the opening 10 extending longitudinally at least partway therethrough. In the preferred embodiment, the material of the coil A is a magnetic steel, so that when the axis of the coil A is vertical, it may be readily raised from the floor long enough for the axis to be tilted to the position shown in FIGURE 1 by means of magnets.

The frame B is generally L-shaped in outline viewed in front elevation as is shown in FIGURE 1, and includes: a side leg 12 in spaced parallel relationship to the sides of the coil A, an end leg 13 in engagement with an axial end of the coil A, and an arbor 14 which as shown is inserted into the opening 10. The arbor 14 when the coil is shown in the position of FIGURE 1, supports the entire weight of the coil A. The side leg 12 extends in spaced parallel relationship to the arbor 14 and will normally be spaced therefrom a distance at least greater than the maximum radial wall thickness of the largest coil A to be handled.

The side leg 12 is generally channel-shaped in transverse cross-section presenting a pair of spaced sides 15, 16 (see FIGURE 3) which converge toward the free end of this leg and an arcuate bridging wall 17 which integrally joins these sides. Normally the longitudinal length of the leg 12 from its point of intersection with the leg 13 is just slightly less than the length of the arbor 14 and both the arbor 14 and the leg 12 will have a length less than the minimum axial length of the shortest coil A to be handled and greater than one half the axial length of the longest coil A to be handled.

The arbor 14 may take any desired form, but is generally a hollow cylinder to conserve weight and will have its lower, outer or left-hand end as viewed in FIGURE 1, rounded or pointed to facilitate the insertion of the arbor 14 in the opening 10. It will further be appreciated that the diameter of the arbor 14 must always be less than the smallest diameter of the opening 10 which the device will be called upon to handle. Primarily, the diameter of the arbor 14 will be dictated by strength requirements. If desired, the arbor 14 and also the outer leg 12 may be made adjustable in length to facilitate its use in handling both long and short coils which are beyond its capacity without this feature.

As is shown, the arbor 14 is inserted into the opening 10 until one axial end of the coil abuts against the inside or lefthand side of the leg 13, all as is shown in FIGURES 1 and 4.

In accordance with the invention, suitable means are provided for holding the coil A in this positon when the axis of the coil is vertical as the device is raised vertically. The exact form that such means take forms no part of the present invention and may include various kinds of gripping devices including known and conventional clamps or expanding means on the arbor 14, but in the preferred embodiment these means comprise a plurality of electro magnets 20 (four being shown), all of which are mounted on the end leg 13 or may be an integral part of the member.

Electro magnets are preferred because they do not physically damage the various turns of the coil A while still having the required lifting action to accomplish the objects of the device.

As best seen in FIGURE 2, these electro magnets are positioned at approximately evenly spaced locations around the axis of the arbor 14. Each electro magnet is generally oblong in cross-section and is snugly received in a complementary oblong recess formed in the end leg 13. The outer walls of the recess may form the outer magnetic pole 21 complementary to the inner magnetic pole 22.

It is also to be noted that in some instances in order to handle coils having a radially thin wall, it will be necessary to have the inner radial edge of the outer pole 21 extend inwardly beyond the outer surface of the arbor 14. To permit this the surface of the arbor may be recessed adjacent the magnets as at 23. The construction of the magnets form no part of the present invention and will not be further described herein other than to state that the magnets, when electrically energized, must have a lifting ability at least sufficient to support the full weight of the maximum size coil A to be handled when the axis of the coil A is vertical.

As is shown in FIGURE 3, the right hand side, that is to say, the side of the end leg 13 remote from the coil A is formed with a recess 24 disposed between the recesses or pockets which receive the electro magnets 20, 21 for reasons which will appear hereinafter.

The frame B considered alone has a center of gravity indicated generally by the reference character 26, while the frame and coil A have a combined center of gravity indicated generally by the reference character 27. It is to be noted that for a given size of frame, the center of gravity 26 will always be at the same point in space. However, the location of the center of gravity 27 will vary depending upon the axial length of the coil A, its diameter and its weight, all in relation to the weight of the frame B. For the purposes of describing the invention, however, it may be considered as located generally somewhat closer to the end leg 13 than the actual center of gravity in the coil A itself, and slightly above the axis of the arbor 14.

In accordance with the present invention, a novel and improved arrangement is provided for transmitting lifting forces to the frame B and for transmitting to it a tilting action about the combined center of gravity 27. While this lifting arrangement may take a number of different forms, in the embodiment shown in the drawings, it comprises an elongated tension member C pivotally fastened at its left end to the side leg 12 at a point 30 spaced from leg 13 a distance greater than the spacing of the combined center of gravity 27 from the end leg 13 and pivotally fastened at its other end to the end leg 13 at a point 31 spaced from the side leg 12 a distance greater than the spacing of the combined center of gravity 27 from the side leg 12. Preferably the spacing is the maximum permitted by the length of the legs 12, 13. In this respect, the combined center of gravity 27 may be that center of gravity which has the maximum spacing from the end leg 13 which may be expected with the maximum size and length coil A to be handled.

Stated otherwise, the point 30 is spaced from the end leg 13 a distance greater than the spacing of the radial line through the combined center of gravity 27 from the end leg 13 while the point 31 is spaced from the end leg 12 a distance greater than the spacing of the combined center of gravity 27 from such end leg 12.

The tension member C in the embodiment shown includes a middle or intermediate portion 33 which is either flexible or made up of a plurality of relatively articulated joints and a pair of rigid end portions 34 and 35 each pivoted to the flexible portion 33 at the points 37, 38 respectively.

These portions 34, 35 perform an important function in the stability of the device.

Thus if the flexible portion 33 extended all the way to the pivot point 30, 31 it will be seen that the frame B could turn over about an axis 40 extending between and defined by the points 30, 31. With the turnover axis shown, the combined center of gravity 27 is below the line and the frame B and the coil A will be stable. However, if the coil A is not in place, then the center of gravity in the frame B is above the turnover axis 40 and in the absence of other arrangements the frame B could turn over about the axis 40. However, and in accordance with the invention, the rigid portions 34, 35 are each pivoted to the respective legs about an axis perpendicular to the plane containing the flexible portion 33, that is to say, the vertical dimetrical plane through the coil A. The longitudinal length of each member 34, 35 is such that the pivot points 37, 38 form a turnover axis 41 located a substantial distance above the center of gravity 26.

The rigid portions 34, 35 are each made up of two rigid members which diverge from the points 37, 38 respectively and are pivotally fastened at their ends to the sides 15, 16 on aligned axes. The members 34, 35 should each have a longitudinal length in relation to the flexible portion 33 such that the frame B may be tilted through an angle of at least 90°.

The support means D is operatively engaged with the tension member C and may take a number of different forms, but in the preferred embodiment, comprises a sprocket 40 rotatably supported in an inverted U-frame comprised of a pair of parallel sides 51 and an upper base 52 integral therewith. A shaft 53 extends through the sides 51 and the sprocket 50. The base 52 has an opening 54 midway between its ends through which a hook or eye 55 from an overhead supporting crane or the like extends. Obviously, any other means for raising or lowering the sprocket 50 may be employed, it being noted that the lifting force for the device is applied through the sprocket 50.

The sprocket 50 is positively and operatively engaged with the flexible portion 33 to move it longitudinally in either direction and is driven for rotation in either direction and is driven for rotation in either direction preferably by a standard gear motor 57 preferably of the worm drive type. Such a type gear motor has the inherent ability of locking the sprocket in any position when the motor is not energized. Obviously other types of mechanism may be employed for rotating the sprocket 50, but if so, suitable braking means will normally have to be provided to prevent the sprocket 50 from rotating and the frame B from tilting except when desired.

In operation and assuming that the coil A is resting on the ground with its axis vertical as is shown in FIGURE 4, the frame B is lowered by the overhead crane with its arbor 14 vertical until the arbor 14 is inserted all the way into the opening 10 of the coil. Thereafter, the magnets 20 are electrically energized and a lifting force is applied to the sprocket 50 until the frame B and coil A are lifted from the floor or other support a short distance sufficient for the frame B and coil A to be tilted to a horizontal axis position.

Thereafter, the gear motor 57 is electrically energized to move the tension member C longitudinally to the right as viewed in the figures until the axis of the coil A is either horizontal or with the free end of the arbor raised slightly above its opposite end. Thereafter, the electro magnets may be de-energized. The coil A is then supported entirely by the arbor 14. The coil A and frame B may then be raised vertically any desired distance and transported horizontally any desired distance without fear that if the electric power fails, the coil A will be dropped.

When the destination is reached, the frame B and coil A are lowered and if it is desired to stack the coil A with its axis horizontal, the coil A is laid on its side and then the frame B moved horizontally to remove the arbor 14 from the opening 10.

If instead it is desired to place the coil A with its axis vertical, the frame B and coil A are lowered toward the ground until relatively close thereto. The electro magnets are again energized and the gear motor 57 operated to move the tension member C to the left as viewed in the figures to tilt the frame B and coil A until the axis of the opening 10 is vertical. Thereafter the frame B is lowered until the lower end of coil A rests on its support, then the electro magnets may be deenergized and the arbor 14 easily withdrawn from the opening 10.

It is to be noted that the tilting action will take place on an axis either on or relatively close to the combined center of gravity 27. Thus the frame B and coil A are in balanced arrangement as they are being tilted and the amount of power required to effect the tilting operation is a minimum.

It will be appreciated that an overhead crane operator may have difficulty in determining when the axis of the arbor 14 is either exactly vertical or exactly horizontal and in this respect, the invention also contemplates one or more position sensitive switches 60, 61 mounted on the frame B, the one switch 60 being arranged to de-energize the gear motor 57 when the arbor 14 reaches a vertical position and the other switch 61 being arranged to de-energize the motor 57 when the arbor 14 reaches a horizontal position or any other predetermined relationship with the ground.

It will be noted that the tension member C when the arbor is horizontal extends through the recess 24. The sides of this recess engage the sides of the tension member and further increase stability against turning over of the frame B. It is to be noted that if the side and end legs are each provided with sufficiently deep longitudinal recesses, the tension member may be flexible throughout its length the sides of the recesses engaging the tension member and effectively raising the turnover axis above the center of gravity. Such an arrangement is also in accordance with the invention.

The invention has been described with particular reference to a preferred embodiment. Obviously, modifications and alterations will occur to others upon a reading and understanding of this specification and it is my intention to include all such modifications and alterations insofar as they come within the scope of the appended claims.

Having thus described my invention, I claim:

1. A handling device for handling a hollow article and for tilting the article between horizontal and vertical axis positions, said device comprising a generally L-shaped frame having first and second legs which are interconnected at one end and which extend substantially perpendicularly away from each other and terminate in free ends remote from each other, an arbor connected at one end to said second leg at a location spaced substantially from the latter's connection to the first leg, said arbor extending substantially parallel to said first leg and in the same direction away from the second leg, said arbor having an opposite free end for insertion in the hollow article to be handled, article holding means on said frame for holding the article on the arbor in all positions thereof, first rigid link means pivotally connected at one end to said first leg toward said remote end thereof, second rigid link means pivotally connected at one end to said second leg toward said remote end thereof, an elongated flexible suspension member having its opposite ends connected respectively to the opposite ends of said first and second rigid link means and extending therebetween above the frame, and driving means in driving engagement with said flexible suspension member and suspending the flexible suspension member, rigid link means, frame, arbor and article holding means as a unit from above, the pivotal connections of said first and second rigid link means to the frame allowing only pivotal movement about an axis transverse to the length of the flexible suspension member to thereby restrain said first and second link means and the frame against rotation transverse to said flexible suspension member.

2. The device of claim 1 wherein said first frame leg, in the vertical axis position of the hollow article, presents guide portions disposed on opposite sides of said flexible suspension member to restrain the frame against movement transversely with respect to said flexible suspension member.

3. The device of claim 1 wherein said second frame leg, in the horizontal axis position of the hollow article, presents guide portions disposed on opposite sides of said flexible suspension member to restrain the frame against movement transversely with respect to said flexible suspension member.

4. A handling device for handling an article and for tilting the article angularly, said device comprising first means for engaging and holding the article which is to be handled, elongated flexible suspension means extending above said first means and having spaced connections thereto, means having driving engagement with said flexible suspension means and supporting the latter, and means on said first means and adapted to coact with said suspension means for blocking said first means against movement transversely with respect to said flexible suspension means so as to prevent said first means from tipping over.

5. A handling device for cylindrical coils having a central axial opening including a frame comprised of a side member adapted to extend longitudinally along one side of said coil, an end member rigidly connected at one end to the side member and adapted to extend diametrically across one axial end of said coil, an arbor rigidly connected at one end to the end member and extending in spaced parallel relationship to and in the same direction as said side member adapted to extend into said coil opening, means for releasably holding the coil on the arbor when its axis is vertical, the improvement which comprises means for suspending and tilting said frame with a coil held thereon including an elongated flexible tension member pivotally fastened at its ends to the end member at a point further from the side member than the combined center of gravity of the frame and the maximum size of coil to be handled and to the side member at a point further from the end member than said combined center of gravity whereby the frame and coil do not tend to tip and means for suspending and longitudinally and controllably moving the tension member longitudinally.

6. The improvement of claim 5 wherein said tension member includes a flexible central portion and rigid end portions, said end portions being pivoted to the frame on axes perpendicular to the diametrical plane through the coil and containing the tension member, said rigid portions being pivoted to the flexible portion at points which define a line passing through the frame above the center of gravity of the frame to thereby prevent rotation of the frame about said flexible portion when the frame is not carrying a coil.

7. The improvement of claim 5 wherein said tension member includes a flexible central portion and rigid end portions, said end portions being pivoted to the frame on axis perpendicular to the diametrical plane through the coil and containing the tension member, and said rigid portions being pivoted to the flexible portions, said rigid end portions are of such length to allow an axis from the pivotal connection on the frame of each portion to pass above said combined center of gravity and an axis from the connection of the rigid end portions with the flexible portion being above the center of gravity of the frame to thereby prevent rotation of the frame about said flexible portion when the frame is not loaded with a coil.

8. A handling device for handling an article and for tilting the article angularly, said device comprising first means for engaging and holding the article which is to be handled, elongated flexible suspension means extending above said first means and having spaced connections thereto, means having driving engagement with said flexible suspension means and supporting the latter, and means for restraining said first means against movement transversely with respect to said flexible suspension means so as to prevent said first means from tipping over, said restraining means comprising rigid links connecting the opposite ends of said flexible suspension means to said first means, said links being pivoted in only one direction about transverse axes through said spaced connections and guide portions on said first means which are disposed on either side of said flexible suspension means.

9. A handling device for handling an article and for tilting the article angularly, said device comprising first means for engaging and holding said article which is to be handled, elongated flexible suspension means extending above said first means and having spaced connections thereto, means having driving engagement with said flexible suspension means and supporting the latter, and means for restraining said first means against movement transversely with respect to said flexible suspension means so as to prevent said first means from tipping over, said restraining means comprises rigid links connecting the opposite ends of said flexible suspension means to said first means, said rigid links having pivotal connections to said first means which restrain said links and the frame against movement transverse to the axis of said pivotal connections.

10. A handling device for handling an article and for tilting the article angularly, said device comprising first means for engaging and holding the article which is to be handled, elongated flexible suspension means extending above said first means and having spaced connections thereto, means having driving connections with said flexible suspension means and supporting the latter, and means for restraining said first means against movement transversely with respect to said flexible suspension means so as to prevent said first means from tipping over, said restraining means comprises guide portions on said first means which are disposed on either side of said flexible suspension means.

11. A handling device for handling an article having a first center of gravity and for tilting the article angularly about an axis transverse to said device, said device comprising a first means for engaging and holding said article and having a second center of gravity, elongated flexible suspension means extending above said first means in a plane substantially perpendicular to said transverse axis, said suspension means having spaced pivotal connections with said first means, the axis between said pivotal connections passing above said first center of gravity and below said second center of gravity, first and second points on said suspension means and each point spaced from one of said pivotal connections, an axis between said points defining the axis of roll of said device on an axis longitudinal of said device, and said roll axis passing below said second center of gravity.

References Cited in the file of this patent

UNITED STATES PATENTS

| | | |
|---|---|---|
| 2,913,276 | Collings | Nov. 17, 1959 |
| 2,945,609 | Benes et al. | July 19, 1960 |

FOREIGN PATENTS

| | | |
|---|---|---|
| 952,746 | Germany | Nov. 22, 1956 |